(12) United States Patent
Jiang et al.

(10) Patent No.: US 8,095,730 B1
(45) Date of Patent: *Jan. 10, 2012

(54) SYSTEM AND METHOD FOR PROVIDING SPACE AVAILABILITY NOTIFICATION IN A DISTRIBUTED STRIPED VOLUME SET

(75) Inventors: Tianyu Jiang, Mars, PA (US); Richard P. Jernigan, IV, Sewickley, PA (US); Eric Hamilton, Durham, NC (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/839,530

(22) Filed: Jul. 20, 2010

Related U.S. Application Data

(63) Continuation of application No. 11/756,932, filed on Jun. 1, 2007, now Pat. No. 7,797,489.

(51) Int. Cl.
*G06F 12/00* (2006.01)
(52) U.S. Cl. .. 711/114; 711/152; 711/172; 711/E12.009
(58) Field of Classification Search .................. None
See application file for complete search history.

(56) References Cited

U.S. PATENT DOCUMENTS

| | | |
|---|---|---|
| 4,899,342 A | 2/1990 | Potter et al. |
| 4,916,608 A | 4/1990 | Shultz |
| 4,989,206 A | 1/1991 | Dunphy, Jr., et al. |
| 5,124,987 A | 6/1992 | Milligan et al. |
| 5,155,835 A | 10/1992 | Belsan |
| 5,163,131 A | 11/1992 | Row et al. |
| 5,202,979 A | 4/1993 | Hillis et al. |
| 5,355,453 A | 10/1994 | Row et al. |
| 5,485,579 A | 1/1996 | Hitz et al. |
| 5,581,724 A | 12/1996 | Belsan et al. |
| 5,615,352 A | 3/1997 | Jacobson et al. |
| 5,701,516 A | 12/1997 | Cheng et al. |
| 5,802,366 A | 9/1998 | Row et al. |
| 5,819,292 A | 10/1998 | Hitz et al. |
| 5,897,661 A | 4/1999 | Baranovsky et al. |
| 5,931,918 A | 8/1999 | Row et al. |
| 5,941,972 A | 8/1999 | Hoese et al. |

(Continued)

FOREIGN PATENT DOCUMENTS

EP 0 892 347 1/1999

(Continued)

OTHER PUBLICATIONS

Administration Guide found at http://www.openafs.org/pages/doc/AdminGuide/auagd010.htm, visited on Mar. 2, 2005, 34 pages.

(Continued)

*Primary Examiner* — Reginald G Bragdon
*Assistant Examiner* — Arvind Talukdar
(74) *Attorney, Agent, or Firm* — Cesari and McKenna, LLP

(57) ABSTRACT

A computer data storage system is described. A processor maintains a striped volume set by striping a data container over a plurality of storage nodes. A storage node determines whether space available on that node is below a predetermined threshold, the predetermined threshold indicating a low-in-space state. The storage node sends a message indicating that the storage node is in a low-in-space state. The processor accepts no further write messages to the data container as long as the storage node is in a low-in-space state.

23 Claims, 11 Drawing Sheets

U.S. PATENT DOCUMENTS

| | | | |
|---|---|---|---|
| 5,963,962 | A | 10/1999 | Hitz et al. |
| 5,987,477 | A | 11/1999 | Schmuck et al. |
| 6,032,216 | A | 2/2000 | Schmuck et al. |
| 6,038,570 | A | 3/2000 | Hitz et al. |
| 6,065,037 | A | 5/2000 | Hitz et al. |
| 6,173,293 | B1 | 1/2001 | Thekkath et al. |
| 6,275,898 | B1 | 8/2001 | DeKoning |
| 6,311,251 | B1 | 10/2001 | Merritt et al. |
| 6,317,808 | B1 | 11/2001 | Berenshteyn |
| 6,324,581 | B1 | 11/2001 | Xu et al. |
| 6,425,035 | B2 | 7/2002 | Hoese et al. |
| 6,502,166 | B1 | 12/2002 | Cassidy |
| 6,564,252 | B1 | 5/2003 | Hickman et al. |
| 6,606,690 | B2 | 8/2003 | Padovano |
| 6,636,879 | B1 | 10/2003 | Doucette et al. |
| 6,643,654 | B1 | 11/2003 | Patel et al. |
| 6,671,773 | B2 | 12/2003 | Kazar et al. |
| 6,697,846 | B1 | 2/2004 | Soltis |
| 6,721,764 | B2 | 4/2004 | Hitz et al. |
| 6,868,417 | B2 | 3/2005 | Kazar et al. |
| 6,931,450 | B2 | 8/2005 | Howard et al. |
| 6,978,283 | B1 | 12/2005 | Edwards et al. |
| 7,010,528 | B2 | 3/2006 | Curran et al. |
| 7,038,058 | B2 | 5/2006 | Lee et al. |
| 7,159,093 | B2 | 1/2007 | Dalal et al. |
| 7,162,486 | B2 | 1/2007 | Patel et al. |
| 7,185,144 | B2 | 2/2007 | Corbett et al. |
| 7,194,597 | B2 | 3/2007 | Willis et al. |
| 7,231,412 | B2 | 6/2007 | Hitz et al. |
| 7,302,520 | B2 | 11/2007 | Kazar et al. |
| 7,366,837 | B2 | 4/2008 | Corbett et al. |
| 7,409,494 | B2 | 8/2008 | Edwards et al. |
| 7,409,497 | B1 | 8/2008 | Jernigan et al. |
| 7,412,496 | B2 | 8/2008 | Fridella et al. |
| 7,454,566 | B1 * | 11/2008 | Overby .................. 711/114 |
| 7,487,308 | B1 | 2/2009 | Dalal et al. |
| 7,698,289 | B2 | 4/2010 | Kazar et al. |
| 7,743,210 | B1 | 6/2010 | Jernigan et al. |
| 7,797,489 | B1 | 9/2010 | Jiang et al. |
| 2002/0049883 | A1 | 4/2002 | Schneider et al. |
| 2003/0188045 | A1 | 10/2003 | Jacobson |
| 2004/0030668 | A1 | 2/2004 | Pawlowski et al. |
| 2004/0122917 | A1 | 6/2004 | Menon et al. |
| 2004/0133570 | A1 | 7/2004 | Soltis |
| 2004/0139167 | A1 | 7/2004 | Edsall et al. |
| 2005/0097260 | A1 | 5/2005 | McGovern et al. |
| 2005/0192932 | A1 | 9/2005 | Kazar et al. |
| 2006/0112222 | A1 | 5/2006 | Barrall |
| 2006/0184587 | A1 | 8/2006 | Federwisch et al. |
| 2006/0184731 | A1 | 8/2006 | Corbett et al. |
| 2007/0088702 | A1 | 4/2007 | Fridella et al. |
| 2008/0155191 | A1 | 6/2008 | Anderson et al. |
| 2008/0301204 | A1 * | 12/2008 | Chodacki et al. ............ 707/205 |

FOREIGN PATENT DOCUMENTS

| | | |
|---|---|---|
| JP | 10003440 | 6/1998 |
| WO | WO 00/07101 | 2/2000 |
| WO | WO-00/52875-A 1 | 9/2000 |

OTHER PUBLICATIONS

Auspex Systems, LFS—A Local File System for Multiprocessor NFS Network Servers, 1994, 6 pages.

Blasgen, M.W. et al., System R: An architectural Overview, Reprinted from IBM Systems Journal vol. 20, No. 1, 1981, Copyright 1981, 1999, 22 pages.

Borenstein, Nathaniel S., CMU's Andrew project a retrospective, Communications of ACM, 39(12), Dec. 1996, 33 pages.

Brinkmann, Andrew et al., Efficient, Distributed Data Placement Strategies for Storage Area Networks, pp. 119-128, published in 2000.

Brown, Mark R. et al., The Alpine file system, ACM Transactions on Computing Systems, 3(4):261-293, Nov. 1985.

Carns, P. H., et al., "PVFS: A Parallel File System for Linux Clusters", Proceedings of the 4.sup.th Annual Linux Showcase and Conference, Atlanta, GA, Oct. 2000, pp. 317-327.

Celerra File Server Architecture for High Availability, EMC2 where information lives, Aug. 1999, 12 pages.

Chutani, Sailesh, et al., The Episode File System, In Proceedings of the USENIX Winter 1992, 18 pages.

Dibble, Peter C., et al., Beyond Striping: The Bridge Multiprocessor File System, Computer Science Department, University of Rochester, Aug. 11, 1989, 8 pages.

Douglis, Fred, et al., A comparison of two distributed systems: Amoeba and Sprite—Computing Systems, 4(4), Fall 1991, pp. 353-385.

Finlayson, Ross S., et al., Log Files: An Extended File Service Exploiting Write-Once Storage Department of Computer Science, Stanford University, Report No. STAN-CS-87-1177, Sep. 1987, 14 pages.

Gait, Jason, Phoenix: A Safe In-Memory File System. Communications of the ACM, 33(1): pp. 81-86, Jan. 1990.

Ganger, Gregory R. et al., Disk Subsystem Load Balancing: Disk Striping vs. Conventional Data Placement, Department of Electrical Engineering and Computer Science, University of Michigan, Ann Arbor, Jan. 5, 1993, 10 pages.

Gray, Jim, et al., The Recovery Manager of the System R Database Manager, ACM Computing Surveys, (13)2:223-242 1981, 20 pages.

Hartman, John H. et al., Performance Measurements of a Multiprocessor Sprite Kernel, Proceedings of the USENIX Conference, 1990, 13 pages.

Hartman, J. H., et al., "Zebra: A Striped Network File System" Proceedings of the Usenix File Systems Workshop, Apr. 1998 pp. 1-9, XP002926950.

Hartman, J. H., et al. "The Zebra Striped Network File System" Dec. 1, 1993, Operating Systems Review, ACM, New York, NY, US, pp. 29-43, XP000418681, Issn: 0163-5908.

Hitz, Dave et al., File System Design for an NFS File Server Appliance, Technical Report 3002, Rev. C395, presented Jan. 19, 1994, 23 pages.

Ho, T.K. et al., A Row Permutated Data Reorganization Algorithm for Growing Server-less Video-on-demand Systems, Department of Information Engineering, the Chinese University of Hong Kong, Shatin, N.T., Hong Kong, May 12, 2003, 8 pages.

Honicky, R.J. et al., A Fast Algorith for Online Placement and Reorganization of Replicated Data, Storage Systems Research Center, University of California, Santa Cruz, Apr. 22, 2003, 10 pages.

Howard, John H., An Overview of the Andrew File System, Carnegie Mellon University, CMU-ITC-88-062 1988, 6 pages.

Howard, John H, et al., Scale and Performance in a Distributed File System, Carnegie Mellon University, CMU-ITC-87-068, Aug. 5, 1987, 33 pages.

Howard, John, H. et al., Scale and performance in a distributed file system, ACM Trans. Computer. System., 6(1), Feb. 1988 pp. 51-81.

Jernigan et al., "System and Method for Implementing Atomic Cross-Stripe Write Operations in a Striped Volume Set", U.S. Appl. No. 11/119,279, filed Apr. 29, 2005, 60 pages.

Kazar, Michael L., et al., Decorum File System Architectural Overview, USENIX Summer Conference, Anaheim, California, 1990, 13 pages.

Kazar, Michael L., Synchronization and Caching Issues in the Andrew File System, Carnegie Mellon University, CMU-ITC-88-063, 12 pages.

Ligon, W. B. III, et al., "Implementation and Performance of a Parallel File System for High Performance Distributed Application", Proceedings of the fifth IEEE International Symposium on High Performance Distributed Computing, Aug. 1996, 10 pages.

Lorie, Raymond, A, Physical Integrity in a large segmented database, ACM Trans. Database Systems, 2(1):91-104, Mar. 1977.

Lorie, RA, Shadow Page Mechanism, IBM Technical Disclosure Bulletin, Jun. 1986, pp. 340-342.

McKusick, Marshall Kirk, et al., A Fast File System for UNIX, Computer Science Division, Department of Electrical Engineering and Computer Sciences, Univ. of CA, Berkley, Feb. 18, 1994, 14 pages.

Miller, Ethan L., et al., RAMA: A File System for Massively Parallel Computers, 12.sup.th IEEE Symposium on Mass Storage Systems, Monterey CA, Apr. 1993, pp. 163-168.

Morris, James H., et al., Andrew: A Distributed Personal Computing Environment, Comm. of the ACM, vol. 29, Mar. 1986, pp. 184-201.

Nelson, Michael et al., "Caching in the Sprite Network File System", ACM, Nov. 1987, pp. 3-4.

Network Appliance, Inc., Notification of Transmittal of the International Search Report and the Written Opinion of the International Searching Authority or the Declaration, International Application No. PCT/US2005/030889, International Filing Date Aug. 31, 2005, Date of Mailing Jan. 13, 2006, 14 pages.

Network Appliance, Inc., Notification of Transmittal of the International Search Report and the Written Opinion of the International Searching Authority, or the Declaration, International Application No. PCT/US2005/031220, International Filing Date Sep. 1, 2005, Date of Mailing Oct. 18, 2006, 12 pages.

Network Appliance, Inc., Notification of Transmittal of the International Search Report and the Written Opinion of the International Searching Authority, or the Declaration, International Application No. PCT/US2006/016055, International Filing Date Apr. 27, 2006, Date of Mailing Nov. 9, 2006, 10 pages.

Ousterhout, John K. et al., The Sprite Network Operating System, Computer Science Division, Department of Electrical Engineering and Computer Sciences, Univ. of CA, Berkley, Nov. 19, 1987, 32 pages.

Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988, 18 pages.

Performance Without Compromise: The Virtual Storage Architecture 1997, 11 pages.

Quinlan, Sean, A Cached WORM File System, Software-Practice and Experience, 21(12):1289-1299 (1991).

Rosenberg, J., et al., Stability in a Persistant Store Based on a Large Virtual Memory, In Security and Persistance, Rosenber, J. & Keedy, J.L. (ed), Springer-Verlag (1990) pp. 229-245.

Rosenblum, Mendel, et al. The Design and Implementation of a Log-Structured File System Jul. 24, 1991 pp. 1-15.

Rosenblum, Mendel, The Design and Implementation of a Log-Structured File System, 1992, pp. 1-93.

Rosenblum, Mendel, et al., The Design and Implementation of a Log-Structured File System, In Proceedings of ACM Transactions on Computer Systems, (10)1:26-52, Feb. 1992.

Rosenblum, Mendel, et al., The LFS Storage Manager, Computer Science Division, Electrical Engin. And Computer Sciences, Univ. of CA, presented at Summer '90 USENIX Technical Conference, Anaheim, CA Jun. 1990, 16 pages.

Ross, R. B. et al., "Using the Parallel Virtual File System", Jul. 2002, 31 pages.

Sandberg, Russel et al. Design and implementation of the Sun Network Filesystem. In Proc. Summer 1985 USENIX Conf., pp. 119-130, Portland OR (USA), Jun. 1985.

Santry, Douglas S., et al., Deciding When to Forget in the Elephant File System, Operating Systems Review, 34(5), (Dec. 1999) pp. 110-123.

Satyanarayanan, M., et al., The ITC Distributed File System: Principles and Design, In Proceedings of the 10th ACM Symposium on Operating Systems Principles, (19)5:56-67, Dec. 1985.

Satyanarayanan, M., A survey of distributed file-systems. Annual Review of Computing Science, 4(73-104), 1989.

Satyanarayanan, M., et al., Coda: A highly available file system for a distributed workstation environment. IEEE Transactions on Computers, 39(4):447-459, 1990.

Satyanarayanan, M., Scalable, Secure, and Highly Available Distributed File Access, Computer May 1990: 9-21.

Seltzer, Margo I., et al., Journaling Versus Soft Updates: Asynchronous Meta-Data Protection in File Systems, Proceedings of 200 USENIX Annual Technical Conference, Jun. 18-23, 2000.

Shinkai, E., et al.: "HAMFS File System" Reliable distributed systems, 1999. Proceedings of the 18th IEEE Symposium on Lausanne, Switzerland Oct. 19-22, 1999, Los Alamitos, CA, USA, IEEE Comput. Soc., US, Oct. 19, 1999, pp. 190-201, XP010356993.

Sidebotham, Bob, Volumes: The Andrew File System Data Structuring Primitive, EEUG Conference Proceedings, Manchester, UK, Autumn 1986.

Simitci, H., et al.: "Adaptive disk striping for Parallel Input/output" Mass Storage Systems, 1999. 16th IEEE Symposium on San Diego, CA, USA, Mar. 15-18, 1999, Piscataway, NJ, USA, IEEE, US, Mar. 15, 1999, pp. 88-102, XP010376289.

Subramanian, Muralidhar, et al., Performance Challenges in Object-Relational DBMSs, Data Engineering Journal 22, Feb. 1999 pp. 28-32.

Welch, Brent B., et al., Pseudo Devices: User-Level Extensions to the Sprite File System, Computer Science Division, Department of Electrical Engineering and Computer Sciences, Univ. of CA, Berkley, Apr. 1988, 13 pages.

Welch, Brent B., et al., Pseudo-File-Systems, Computer Science Division, Department of Electrical Engineering and Computer Sciences. Univ. of CA, Berkley, Oct. 1989, 22 pages.

West, Michael, et al. The ITC Distributed File System: Prototype and Experience, Carnegie-Mellon University, Technical Report CMU-ITC-040, Mar. 1985, 17 pages.

Satyanarayanan, M., et al., Coda: A highly available file system for a distributed workstation environment Carnegie Mellon University, CMU-ITC. Jul. 1989, 5 pages.

Supplementary European Search Report, European Application No: 02734438.1-2212/ 1388061, PCT/US0215421, Applicant: Decru, Inc., Date of Mailing: Oct. 6, 2010, pp. 1-5.

* cited by examiner

1000

| MSID | 1005 |
| EPOCH | 1006 |
| VOL TYPE | 1007 |
| SET SIZE | 1008 |
| STRIPE WIDTH | 1010 |
| STRIPE ALGORITHM ID | 1015 |
| DSIDs | 1020 |
| ⋮ | 1025 |

STRIPING RULES 1030 (braces fields 1006–1025)

SYSTEM AND METHOD FOR PROVIDING SPACE AVAILABILITY NOTIFICATION IN A DISTRIBUTED STRIPED VOLUME SET

RELATED APPLICATION

The present application is a continuation of U.S. application Ser. No. 11/756,932, filed Jun. 1, 2007 by Tianyu Jiang et al., entitled SYSTEM AND METHOD FOR PROVIDING SPACE AVAILABILITY NOTIFICATION IN A DISTRIBUTED STRIPED VOLUME SET, which is now issued as U.S. Pat. No. 7,797,489 on Sep. 14, 2010.

BACKGROUND OF THE INVENTION

1. Field of the Invention

The present invention is directed to storage systems and, in particular, to managing space availability in a distributed striped volume set of a storage system cluster.

2. Background Information

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

A plurality of storage systems may be interconnected to provide a storage system environment configured to service many clients. Each storage system may be configured to service one or more volumes of the disks, wherein each volume stores one or more data containers, such as files and logical units. Alternatively, the volumes serviced by the particular storage system may be distributed among all of the storage systems of the environment. This configuration distributes the data access requests, along with the processing resources needed to service such requests, among all of the storage systems, thereby reducing the individual processing load on each storage system. In addition, the storage system environment may be configured to stripe a data container across a plurality of is volumes configured as a striped volume set (SVS), where each volume is serviced by a different storage system of the environment, e.g., a cluster. One technique for data container striping is described in U.S. Pat. No. 7,698,289 by Michael Kazar et al., issued on Apr. 13, 2010, entitled STORAGE SYSTEM ARCHITECTURE FOR STRIPING DATA CONTAINER CONTENT ACROSS VOLUMES OF A CLUSTER. Broadly stated, stripes of content (data) of a data container are allocated to each volume of the SVS in a manner that distributes data across the volumes of the SVS. Each stripe has a defined size/width as specified by a set of striping rules associated with the SVS.

In order to stripe a data container across multiple storage systems or nodes in the cluster, a write request directed to the data container is routed to different constituent volumes of the SVS. However, these volumes may have differing storage space capacities, and/or differing amounts of available storage space at the time the write request is received. Consequently, one constituent volume of the SVS may have the space to accommodate (i.e., process and store) a stripe of data associated with the request while another volume in the SVS may not have sufficient space to accommodate its intended stripe. Thus, there is a need to notify the nodes hosting the volumes in the SVS as to the availability of storage space within each constituent volume of the SVS in order to verify whether there is enough space for an intended striping operation. Otherwise, a write request will be rejected and forwarded elsewhere if all of the intended constituent volumes in that SVS cannot accommodate the request.

Thus, there remains a need for managing cross stripe write operation in a SVS and notifying other nodes in the cluster whether enough space is available to allow such operations.

SUMMARY OF THE INVENTION

The disadvantages of prior techniques are overcome by the present invention, which relates to a method and system for providing notification of storage space availability for data container striping among nodes in a storage system cluster. The present invention also provides a method and system for allowing cross-striped write operations in reserved storage space of a striped volume set for a portion of a data container. A is master data volume node is configured to periodically send space availability detection messages to a plurality of data volume nodes hosting constituent volumes of the striped volume set. If the available storage space of one of the constituent volumes in the striped volume set reaches a predetermined low threshold, the node hosting the constituent volume places the volume in a low-in-space state. The data volume node then reports its state using a low in space identifier to the master data volume node in response to the space availability detection message. The master data volume node then instructs all of the data volume nodes to place their constituent volumes into corresponding low-in-space required states such that no further write operations are accepted for the striped volume set. Once all of the constituent volumes in the striped volume set have sufficient available storage space, their respective hosting nodes transition the volumes from the low-in-space states, and report this state transition to the master data volume node using an appropriate identifier. When all of the constituent volumes have transitioned from the low-in-space state, the master data volume node instructs the nodes hosting those volumes to transition from the low-in-space required states so that write operations are accepted. A procedure for utilizing reserved space to complete an accepted cross stripe write operation is also provided.

BRIEF DESCRIPTION OF THE DRAWINGS

The above and further advantages of the invention may be better understood by referring to the following description in conjunction with the accompanying drawings in which like reference numerals indicate identical or functionally similar elements:

FIG. 10 is a schematic block diagram of a VLDB SVS entry in accordance with an embodiment the present invention;

DETAILED DESCRIPTION OF AN ILLUSTRATIVE EMBODIMENT

The present invention provides a method and system for managing storage space availability for data container striping among nodes in a storage system cluster that includes a novel process for notification of space requirements and availability, as well as a process for permitting acceptance of cross stripe write operations where a constituent volume of a striped volume set has low space availability.

Figure 1:
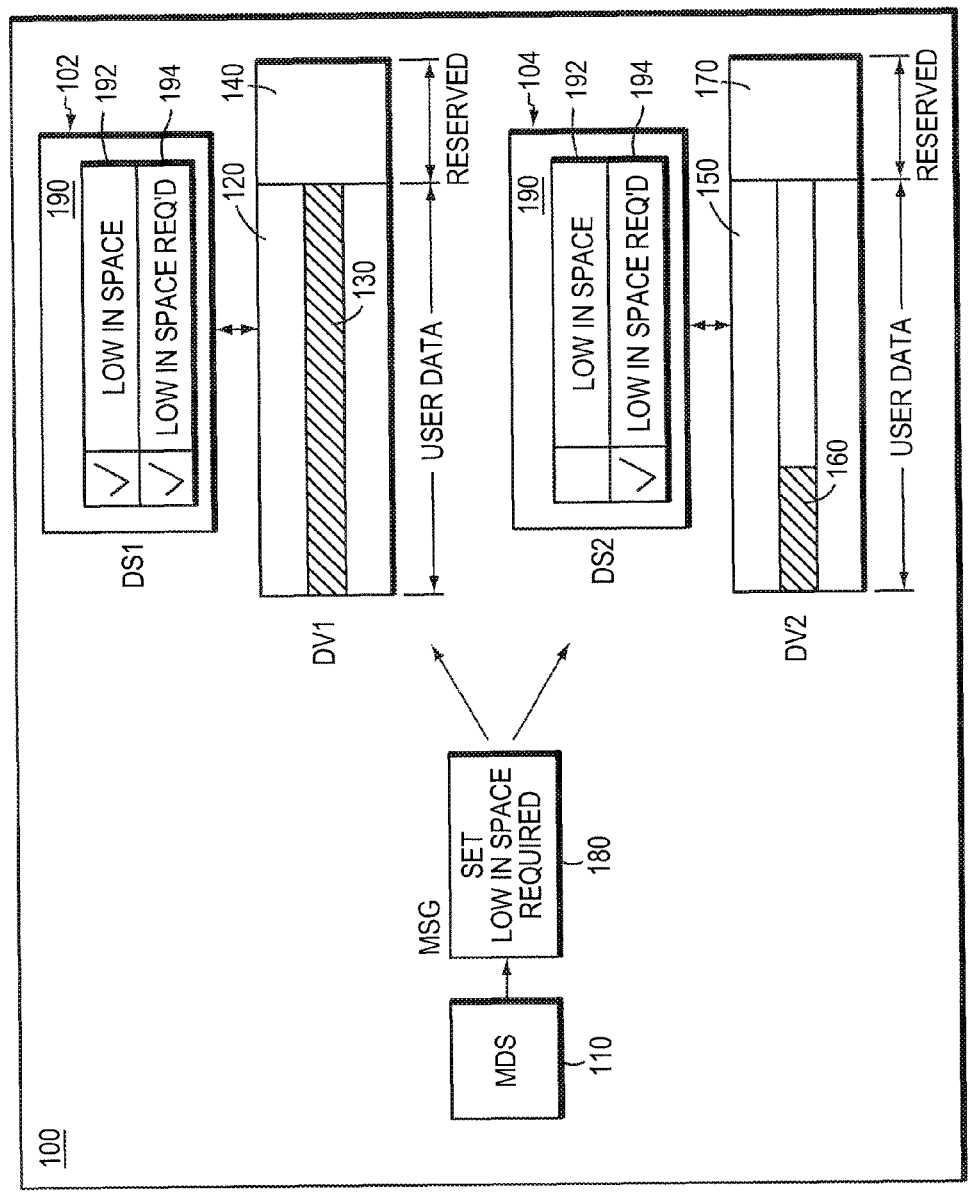
FIG. 1 is a schematic illustration of a cluster having two data volumes and depicting the space designations in each data volume, which may be used in accordance with an illustrative embodiment of the present invention.

FIG. 1 illustrates a cluster 100 having two constituent data volumes DV1 and DV2 of a striped volume set (SVS). DV1 is hosted by data volume node or server DS1, which is designated by reference character 102. DV2 is hosted by data volume node or server DS2, which is designated by reference character 104. The cluster 100 is managed by a master data volume node or server (MDS) 110 that may be configured to host a meta-data volume of the SVS. Although the MDS, in the illustrative embodiment of the invention, hosts the meta data volume, it should be understood that in alternative embodiments of is the invention, a different node or server hosting a different volume may be designated as the MDS. In addition, the MDS 110 is configured to execute a space availability process described further herein. This space availability process executes one or more computer instructions to manage and detect an individual constituent volume's space limitations and generates messages to several hosting volumes of the SVS about whether to accept a write request depending upon the space limitations of those constituent volumes. In the embodiment illustrated in FIG. 1, the data volumes DV1 and DV2 are physically located on the same data element (D-module), however, it is noted that the data can be striped across volumes that are associated with different D-modules in a cluster such as that illustrated in FIG. 5.

The constituent data volume DV1 has user data consumable storage space as illustrated by the reference character 120. The user data space 120 contains storage space designated for a stripe 130 to be written therein which represents a given offset of a data container being written to the SVS. That is, this stripe is one stripe of the data container to be striped across the SVS of the cluster 100. In addition to user data space 120 that is consumable by clients, DV1 also has reserved storage space 140, which is typically reserved for storage of administrative information or data regarding other housekeeping tasks for the volume. Similarly, the data volume DV2 has user data space 150 upon which a stripe of data 160 may be written. In the illustrative example, the length of the stripe of data 160 does not comprise the entire user data space of DV2. DV2 also contains reserved space 170.

The MDS 110 issues messages such as message 180 that notifies the constituent volumes of the SVS about space availability in each data volume. In the case of the data being striped across volumes of different D-modules, such messages are sent as remote procedure call (RPC) messages by the cluster interface module 740 of the master data server, across the cluster switching fabric 550 (FIG. 5), which couples the nodes of the cluster, and such messaging is described in further detail with reference to FIGS. 7 and 8 hereof. Illustratively, the RPC is sent as a D-module to D-module message, such as from MDS 110 to a respective DS on another D-module (as shown in FIG. 1). Once the message arrives, it is handled by the space availability process 766 running on the DS. A response is then sent by the DS to the MDS 110, across the cluster switching fabric.

In accordance with the invention, each constituent volume has two states: a LOW-IN-SPACE state, and a LOW-IN-SPACE REQUIRED state. To that end, each data server has memory space 190 that is configured with a first data structure that is an identifier of a low in space state, e.g., LOW_IN_S-PACE flag 192, and a second data structure that is an identifier of a low in space required state, e.g., a LOW-IN-SPACE-REQUIRED flag 194, as illustrated in DS2 104. As described further herein, the LOW-IN-SPACE state flag 192 indicates that a constituent volume, such as DV1, has reached a space limitation threshold in its user data space 120, as detected by its local file system executing in DS1; notably, assertion of the flag 192 does not indicate a space constraint in reserved space 140, and the reasons for this will become apparent from the description herein. The LOW-IN-SPACE REQUIRED state flag 194 indicates that the constituent volume has been advised by the MDS 110 that one of the volumes in the SVS is in a LOW_IN-SPACE state. Thus, in the example, the constituent volume DV2 is advised by the MDS 110 that no write request/operation should be accepted for that constituent volume and more generally, for the entire SVS. In accordance with the invention, constituent volume DV2 transitions to a LOW_IN_SPACE REQUIRED state and sets respective flag 194. Note that the volume DV2 is not itself in a space constrained, i.e., LOW_IN_SPACE, state, so its LOW_IN_S-PACE flag 194 is not set in the example.

Figure 2:
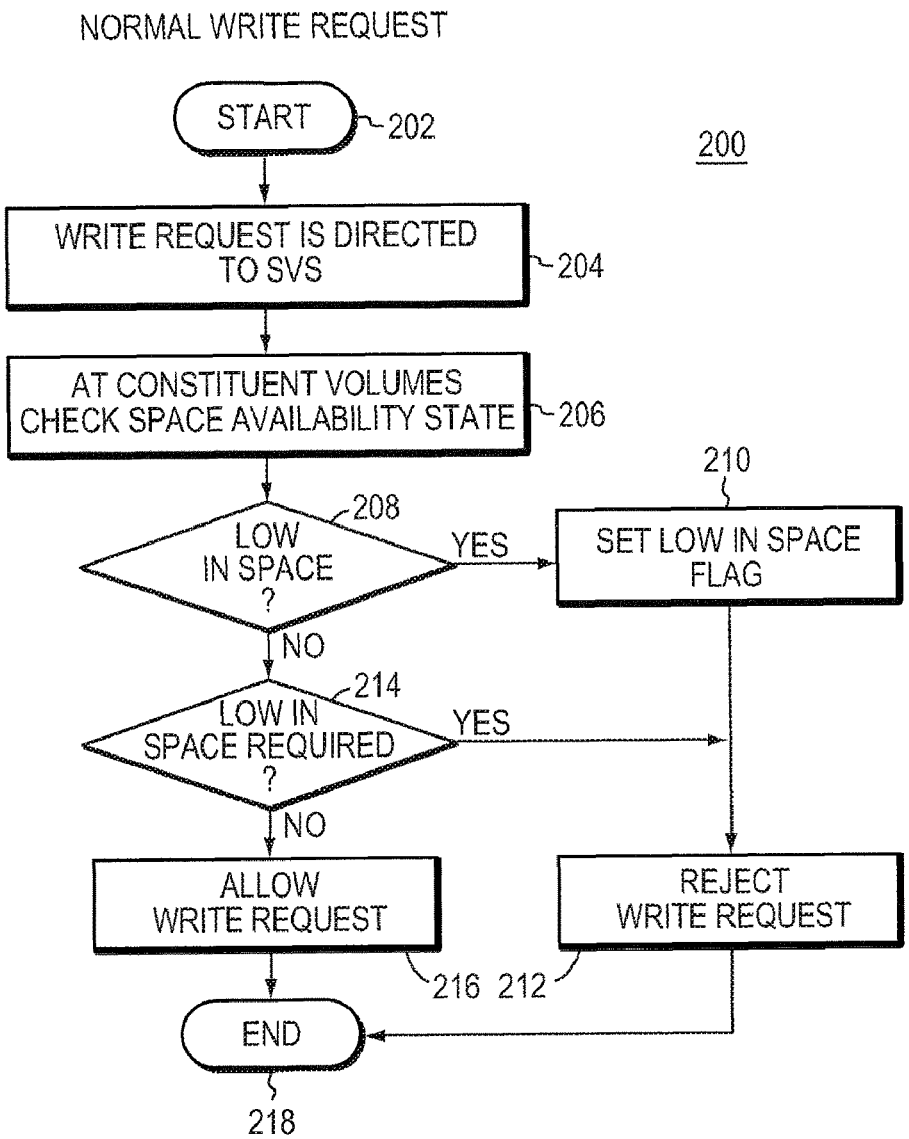
FIG. 2 is a flow chart of a procedure for processing a normal write request in accordance with an illustrative embodiment of the invention.

The example described above may be better understood with reference to the flow chart 200 of FIG. 2. The procedure begins with the start step 202 and continues to step 204 in which a write request is directed to the SVS. In response to the receipt of this write request, or periodically as part of an ongoing space management availability process, the MDS 110 sends a space availability detection message to the constituent volumes of the SVS. This space availability detection message causes each constituent volume to check its space availability states, as illustrated in step 206. In accordance with the invention, each constituent volume performs a "fictitious" write request (such that it simulates an attempt to accommodate an intended write) to determine if it has space to store write data of a given amount determined by, e.g., an appropriate algorithm. The algorithm can be configured to allow the constituent volume to check for a particular amount of space, as desired in a particular application of the invention. Illustratively, the amount of space may be, for example, one stripe width as specified in striping rules associated with the SVS, plus the maximum size of a write request allowed by the protocol. As described herein, a stripe width is stored in a VLDB SVS entry for the SVS. Thus, the algorithm may be one stripe width plus the maximum size of a write request allowed by the protocol. In response to receiving the space availability detection message from the MDS 110, the local file system of a server e.g., DS1, hosting the constituent volume, e.g., DV1, checks whether the volume has the equivalent of one stripe width plus reserved space. If so, the space availability process executing on DS1 will allow the LOW-IN-SPACE flag 192 to remain unasserted. If, on the other hand, DS1 finds that the correct amount of space as specified is not available on the constituent volume DV1, then the LOW-IN-SPACE flag 192 is asserted in the memory 190. Thus, a message is returned from the DS1, which includes two states, the LOW-IN-SPACE state, and the LOW-IN-SPACE REQUIRED state of DV1. That is, DS1 returns a message to the MDS that shows that the LOW-IN-SPACE flag 192 is asserted. Upon receiving the message, the MDS examines the LOW_IN_SPACE state flag 192 which, if asserted, causes the MDS to send a message to all servers hosting constituent data volumes of the SVS, indicating that they should assert (set) their LOW_IN_SPACE REQUIRED flags. This message is illustrated as message 180 in FIG. 1.

Specifically, when the LOW_IN_SPACE decision step 208 is reached, and the MDS determines that one of the constituent volumes does have the LOW_IN_SPACE flag 192 asserted, then in step 210, the MDS sends a set LOW_IN_SPACE REQUIRED message to all servers hosting the DV's, in response to which each constituent volume sets its LOW_IN_SPACE REQUIRED flag 194. In the meantime, as to this particular write request, the process continues to step 212 where the write request is rejected. The procedure then ends at step 218.

If, on the other hand the LOW_IN_SPACE flag is not asserted in any of the constituent volumes, the procedure continues to step 214 where a determination is made as to whether a LOW_IN_SPACE REQUIRED flag 194 is asserted. Assuming that the flag 194 is not asserted, the procedure continues to step 216 where write request is allowed, and the procedure ends at step 218.

However if, on the other hand, the LOW_IN_SPACE REQUIRED flag is asserted for one of the constituent volumes, the procedure loops back to step 206 and another space availability detection message is sent by the MDS to the servers hosting the constituent volumes. In response, each server of each constituent volume performs the space availability check determination process described herein. In this instance, if storage space has been "freed" up (i.e., space is made available due to the deletion of data, such as files), each constituent volume transitions from its LOW_IN_SPACE state. In response to determining that no constituent volume is in a LOW_IN_SPACE state, the MDS sends a message to each volume instructing it to unassert the LOW_IN_SPACE REQUIRED flag 194. In other words, if the space state information responses received from the constituent volumes indicates that no volume is in a LOW_IN_SPACE state, then the MDS sends a message to unassert the LOW_IN_SPACE REQUIRED flag for all the volumes. The servers DS1, DS2 hosting the constituent volumes DV1 and DV2, for example, then transition the volumes from the LOW_IN_SPACE REQUIRED state so that write requests can continue to be allowed as in step 216. The procedure ends at step 218.

In an illustrative embodiment of the invention, the MDS sends space availability detection messages periodically to the constituent volumes of the SVS and does not necessarily wait for a write request. On receiving the message, the local file system of each server controlling each constituent volume checks to see whether the volume has space to hold the maximum size of the write request plus a reservation value as discussed. If so, the file system transitions the volume from its LOW_IN_SPACE state, and reports the two states to the MDS 110. The messaging can be summarized in the following chart:

| | |
|---|---|
| MDS | SENDS SPACE AVAILABILITY DETECTION MESSAGE |
| | RECEIVES REPLIES FROM CONSTITUENT VOLUMES |
| | IF ANY CONSTITUENT VOLUME IS IN LOW IN SPACE STATE, THEN SEND MESSAGE TO ALL CONSTITUENT VOLUMES TO "SET LOW IN SPACE REQUIRED" STATE |
| | IF NONE IS IN LOW IN SPACE STATE, THEN SEND A MESSAGE STATING UNSET LOW IN SPACE REQUIRED |
| CONSTITUENT VOLUME | RECEIVES SPACE AVAILABILITY DETECTION MESSAGE FROM MDS |
| | IF LOW IN SPACE EXISTS, E.G., NOT ENOUGH SPACE TO HOLD MAX SIZE OF WRITE, PLUS MAXIMUM SIZE OF WRITE REQUEST ALLOWED BY THE PROTOCOL, SET LOW IN SPACE STATE; IF THE DV CAN HOLD THE WRITE, THE LOW IN SPACE FLAG IS CLEARED |
| | REPORT TWO STATES TO MDS: |
| |    LOW IN SPACE |
| |    LOW IN SPACE REQUIRED |
| | IF LOW IN SPACE REQUIRED MESSAGE IS RECEIVED, SET LOW IN SPACE REQUIRED STATE |
| | IF UNSET LOW IN SPACE REQUIRED MESSAGE IS RECEIVED, CLEAR LOW IN SPACE REQUIRED STATE |

Figure 3:
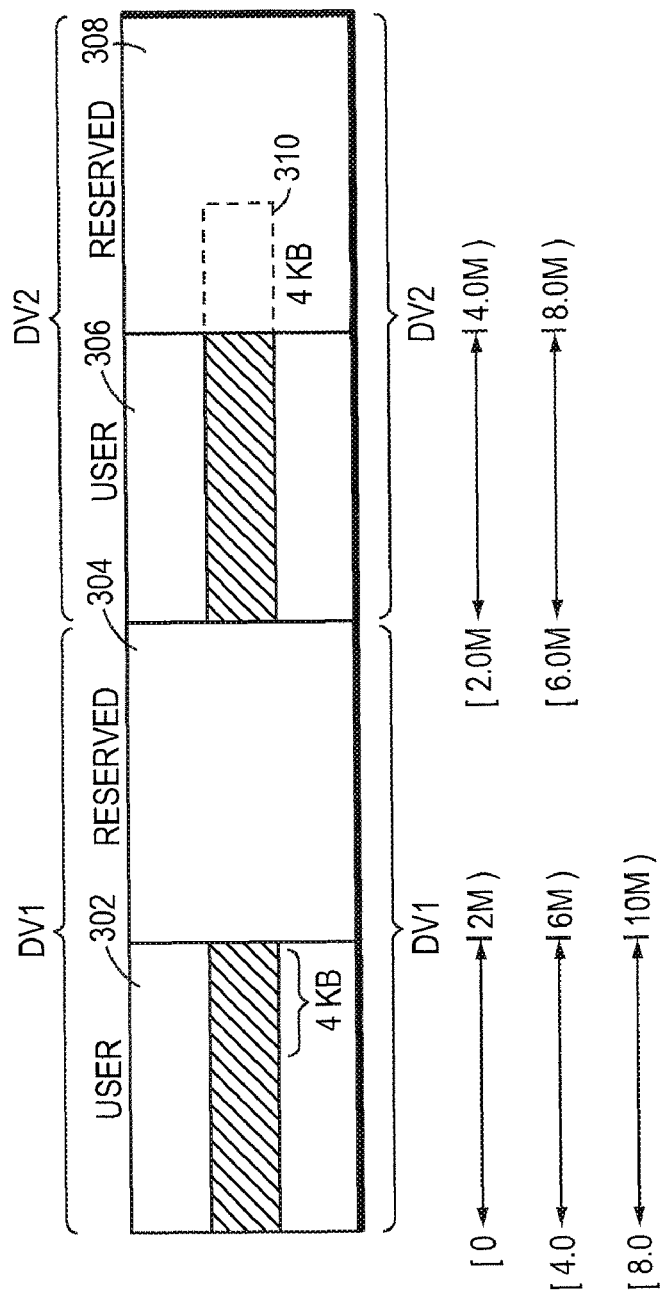
FIG. 3 is a schematic illustration of two data volumes and a cross stripe write operation.

FIG. 3 illustrates two data volumes, DV1 and DV2 of a SVS. DV1 has user-consumable space 302 and reserved space 304. DV2 has user-consumable space 306 and reserved space 308. Assume, by way of example, that an N-module (not shown) receives a data access request such as a write request directed to a file on a D-module serving a volume (e.g., DV1) that stores the first stripe affected by the request. A volume striping module (i.e., the VSM) of the node/server hosting DV1 obtains a lock on the affected region of the file and determines whether the write data operation fits into a single stripe by examining the length of the data, the stripe width, and the location within the stripe at which the write operation begins. In the illustrative embodiment, by way of example, the is stripe width is 2 MB, and the write request writes to offset 2 MB-4 KB, and the total write is 8 KB. So the DV1 will hold 4 KB worth of data from offset 2 MB-4 KB to 2 MB, and DV2 will hold the second 4 KB worth of data of offset 2 MB to 2 MB+4 KB. In the example, the first stripe fills the user space 302 of DV1 with the data. Then, the excess data portion is forwarded to DV2 in a cross stripe write operation. Thus, in response the VSM of DV2 establishes a range lock on 4K of the stripe region, i.e., the DV locks the specified range such as 2 MB-4 KB to 2 MB such that another write operation cannot occur in that space in the interim. The stripe portion of the file is written in its proper stripe location on DV2, as illustrated. Once the data is written at DV2, in the example, the VSM of DV2 notifies DV1 to inform it of the success of the write operation. Further details of the basic cross stripe write operation are provided in U.S. Pat. No. 7,743,210, issued on Jun. 22, 2010, of Jernigan et al., for a SYSTEM AND METHOD FOR IMPLEMENTING ATOMIC CROSS STRIPE WRITE OPERATIONS IN A STRIPE VOLUME SET, which is incorporated herein by reference.

An issue that arises with respect to such cross stripe writes occurs when the cross is stripe write operation is accommodated and acknowledged by a first constituent volume of the SVS, but a second constituent volume does not have available storage space to accommodate its portion of the operation. In other words, a portion of the data associated with the cross-stripe write operation is stored on a first stripe of a first volume in the SVS, but the remaining data associated with the operation cannot be stored on a second stripe of a second volume. In such a case, an error or failure will occur because the cross-stripe write operation has not completed successfully.

More specifically, a problem arises if there is a space availability limitation on DV2. Typically, the VSM of DV1 acknowledges to the client that the write operation has been accepted prior to forwarding the excess data to the VSM serving the second data volume DV2. Thus, in the example, the write operation has been accepted and acknowledged to the client after the first stripe of data associated with the operation has been written in space 302 of DV1. When the excess data portion is forwarded on to DV2, however, it is found (in the example) that DV2's space 306 is already consumed. Thus, the space is not available. The present invention provides for handling the cross stripe write operation in this instance. More specifically, in accordance with the invention, DV2 writes the excess data in its reserved space 308, as indicated by the dotted line 310. Thus, on DV2, when a cross stripe write request is received, the local file system checks space availability. First, the constituent volume is queried to determine if the volume can accept the write without using reserved space. If it can, the write proceeds in accordance with the normal procedure as just described herein. Alternatively, if DV2 cannot handle the write request using its non-reserved space 306, then DV2 checks the reserved space 308 to see whether the volume can hold the cross stripe write request in its reserved space. If this can be done, then in accordance with the invention, the VSM of DV2 marks the volume as being in a LOW_IN_SPACE state. In such a LOW_IN_SPACE state, as described herein, DV2 can reject normal write requests, but it does perform the instant cross stripe write request and writes the information at 310 in space 308.

Furthermore, if the reserved space is used to process the cross stripe write request, on responding to DV1 for the cross stripe write request, DV2 notifies DV1 of its LOW_IN_SPACE state. Upon receiving the response from DV2, with the LOW_IN_SPACE state information, DV1 asserts its LOW_IN_SPACE state so that no further writes are accepted at DV1, even if DV1 happens to have sufficient user-consumable space. This prevents DV1 from generating additional cross stripe writes targeting DV2. Notably, DV2 is now consuming reserved space. If DV2 does not have enough reserved space for the write request, then the write is rejected and an error message is set.

Figure 4A:
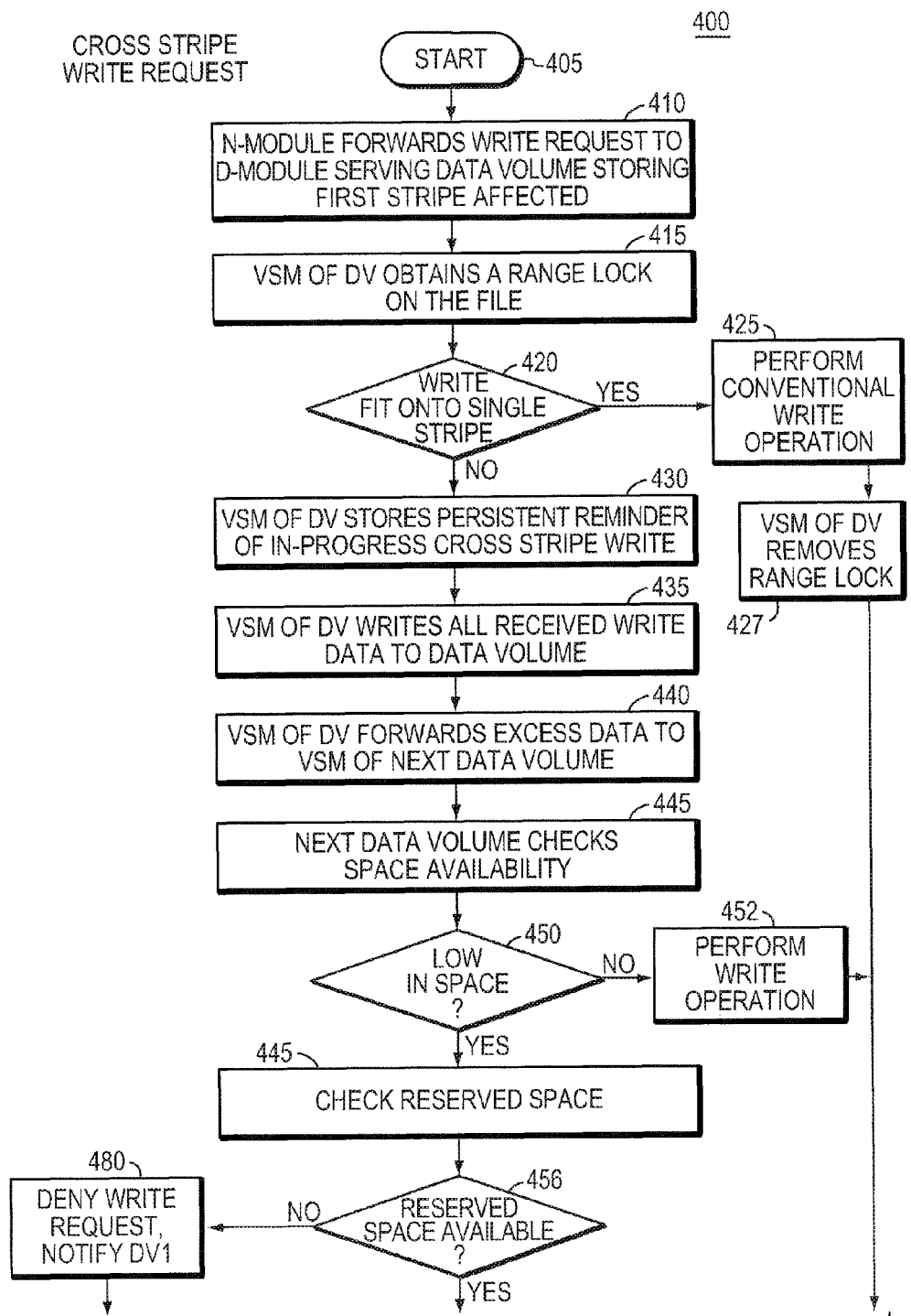
FIGS. 4A and 4B together form a flow chart of a procedure for managing a cross stripe write in accordance with an illustrative embodiment of the present invention.
Figure 4B:
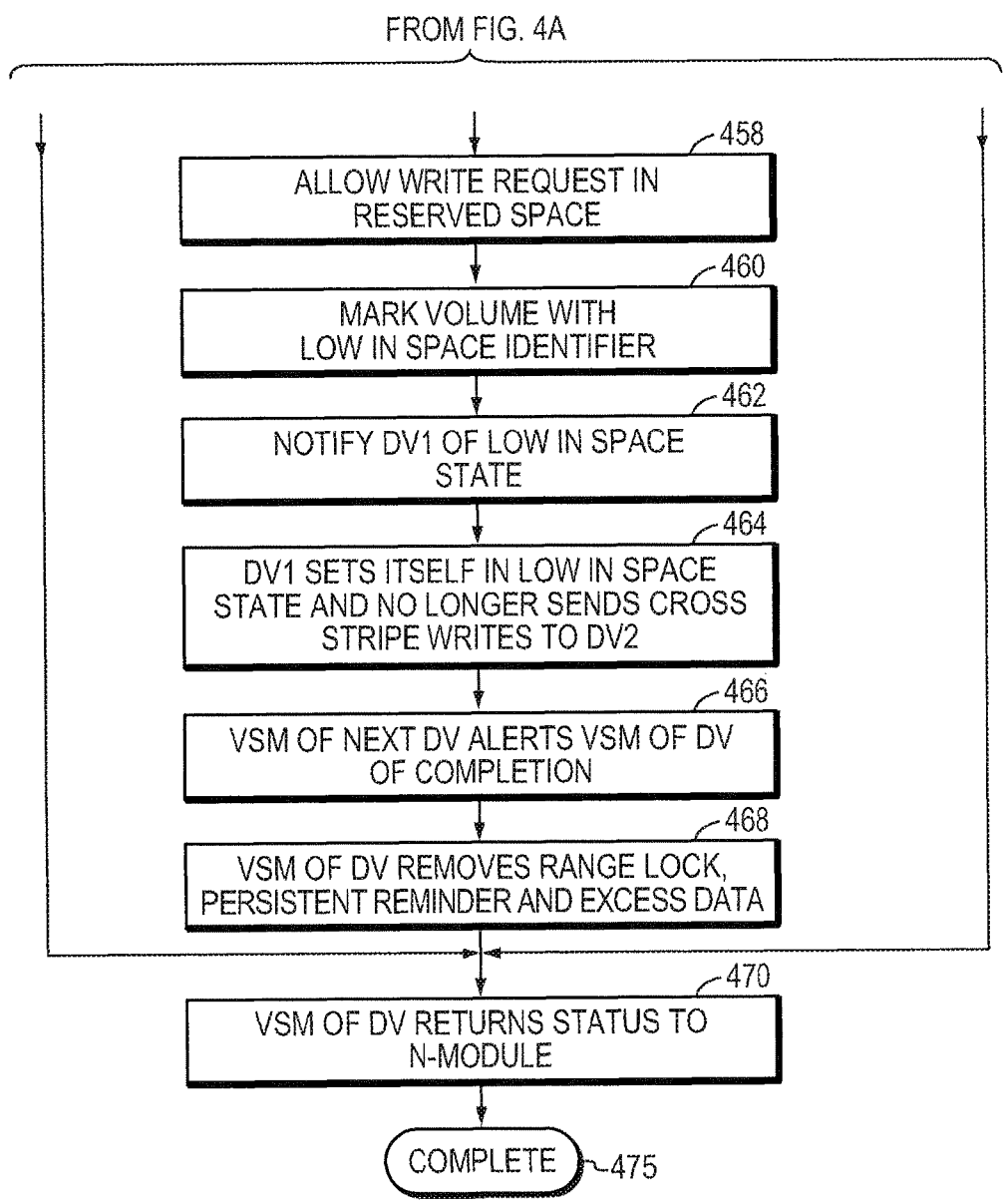

This procedure may be further understood with reference to the flow chart of FIGS. 4A and 4B, which sets forth a procedure 400 for handling cross stripe write requests in accordance with the invention. The procedure begins at step 405 and continues to step 410 in which an N-module redirects (forwards) a data access request such as a write request directed to a data container, such as a file on a D-module serving a volume, e.g., DV1, which stores the first stripe affected by the request. This may be accomplished by, for example, the N-module utilizing a "Locate" function to identify on which volume the initial offset of the file resides. For example, if the write request begins at offset n within the file, the Locate function returns the identity of the volume storing the stripe containing offset n. In the example discussed with reference to FIG. 3, the first portion of the write was written at offset 2.0 MB-4 KB on the D-module serving DV1. Notably, the entire write data associated with the write request is redirected to the VSM of the D-module serving the data volume that stores the first stripe affected by the operation.

In step 415, the VSM of DV1 obtains a range lock for the affected region of the file, i.e., for the entire size/length of the write data associated with the operation on that volume. In step 420, the VSM of the D-module DV1 determines whether the write data of the operation fits into a single stripe (the first stripe), by examining the length of data, the stripe width and the location within the stripe which the write operation begins. If the write data fits within the stripe, the procedure branches to step 425 where a conventional write operation is performed. Thereafter, in step 427, the VSM of DV1 removes the range lock on that region of the file and proceeds to report the status of the write to the N-module. The procedure completes at step 475.

If, on the other hand, the write does not fit into the single stripe, then the procedure continues to step 430 where the VSM of DV1 stores a persistent reminder of the "inprogress" cross stripe write operation. In step 435, the VSM of DV1 writes all received write data for the first stripe to its data volume and, in step 440, forwards the request to the next data volume.

In step 445, the next data volume DV2 checks its space availability in step 450. If DV2 is not low-in-space, then the DV2 performs the write operation as shown in step 452 in accordance with the normal procedure, and in step 470 notifies DV1 that the write request has completed successfully.

If, on the other hand DV2 is low-in-space, the procedure continues to step 454 where reserved space is checked. If reserved space is available (step 456), the write request is allowed in step 458. The volume is then marked as LOW_IN_SPACE, in step 460. In step 462, DV2 notifies DV1 of its LOW_IN_SPACE state. DV1 no longer sends cross stripe write requests to DV2, and also transitions to a LOW_IN_SPACE state so that no further cross stripe requests will be permitted at DV1, as shown in step 464. The VSM of DV2 alerts the VSM of DV1 of the completion of the cross stripe write request (using reserved space) in step 466. The range lock, persistent reminder, and excess data is removed at DV1, as shown in step 468. DV1 returns the status of the cross stripe write as having been completed to the N-module as shown in step 470, and the procedure completes at step 475.

Returning to step 456, if reserved space is not available, the write request is denied at step 480 and DV1 is notified. The status reported to the N-module in step 470 is that of an error message in order to notify the administrator that the write could not be successfully completed. The procedure ends at step 475.

A. Environment

Figure 5:
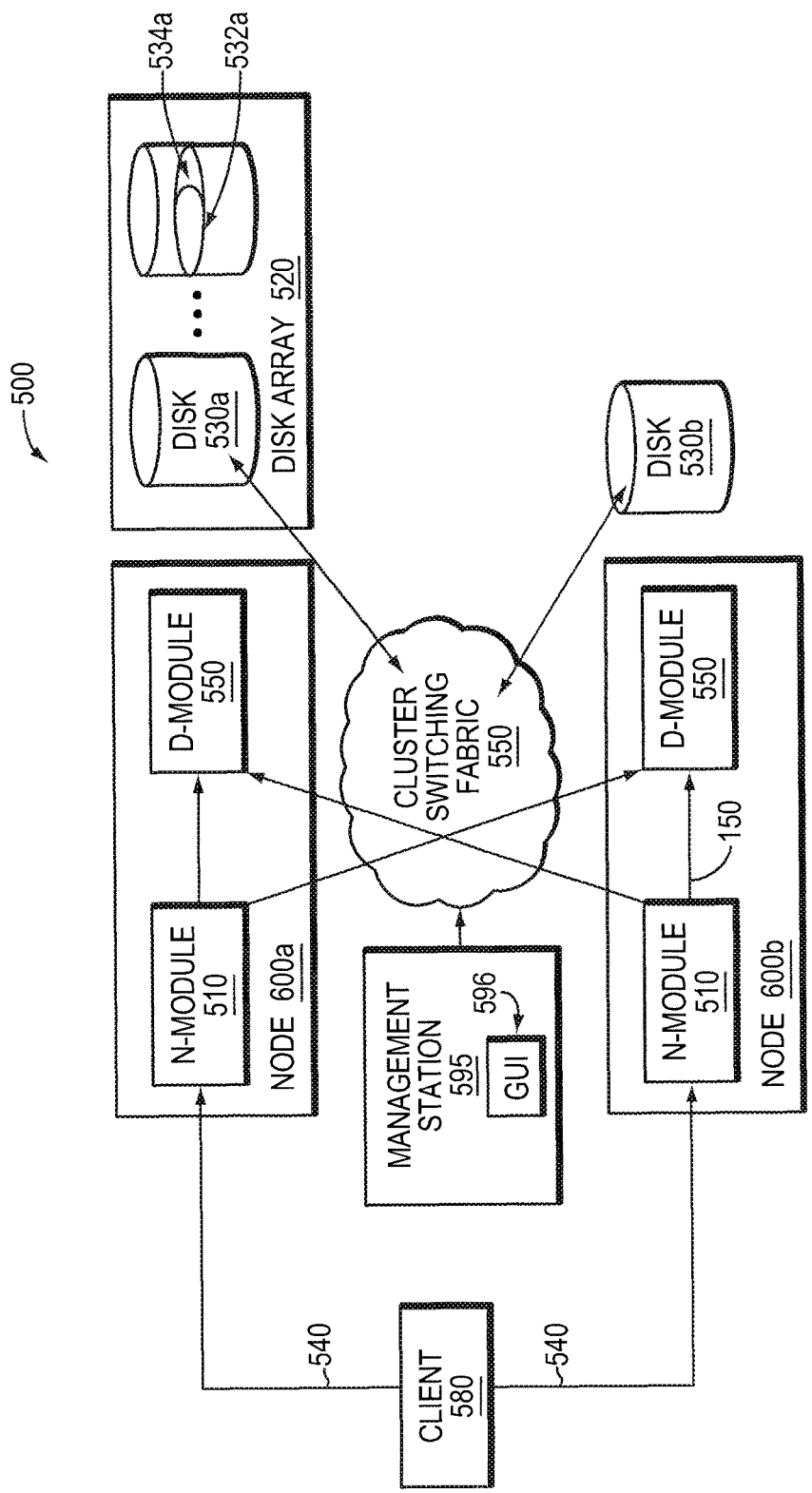
FIG. 5 is a schematic block diagram of a plurality of nodes interconnected as a cluster in accordance with an embodiment of the present invention.

By way of providing a further detailed description of an illustrative embodiment is of the invention, the environment in which the illustrative embodiment can be employed is illustrated in FIGS. 5-10. FIG. 5 is a schematic block diagram of a plurality of nodes 600 a,b interconnected as a cluster 500 and configured to provide storage service relating to the organization of information on storage devices. The nodes 600 comprise various functional components that cooperate to provide a distributed storage system architecture of the cluster 500. To that end, each node 600 is generally organized as a network element (N-module 510) and a disk element (D-module 550). The N-module 510 includes functionality that enables the node 502 to connect to clients 580 over a computer network 540, while each D-module 550 connects to one or more storage devices, such as disks 530 of a disk array 520. The nodes 502, 504 are interconnected by a cluster switching fabric 550 which, in the illustrative embodiment, may be embodied as a Gigabit Ethernet switch. An exemplary distributed file system architecture is generally described in U.S. Pat. No. 6,671,773, entitled METHOD AND SYSTEM FOR RESPONDING TO FILE SYSTEM REQUESTS, by M. Kazar et al., issued Dec. 30, 2003, which is incorporated herein by reference in its entirety. It should be noted that while there is shown an equal number of N and D-modules in the illustrative cluster 500, there may be differing numbers of N and/or D-modules in accordance with various embodiments of the present invention. For example, there may be a plurality of N-modules and/or D-modules interconnected in a cluster configuration 500 that does not reflect a one-to-one correspondence between the N and D-modules. As such, the description of a node 600, for example, comprising one N-module and one D-module should be taken as illustrative only.

The clients 580 may be general-purpose computers configured to interact with the node 600 in accordance with a client/server model of information delivery. That is, each client may request the services of the node, and the node may return the results of the services requested by the client, by exchanging packets over the network 540. The client may issue packets including file-based access protocols, such as the Common Internet File System (CIFS) protocol or Network File System (NFS) protocol, over the Transmission Control Protocol/Internet Protocol (TCP/IP) when accessing information in the form is of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

B. Storage System Node

Figure 6:
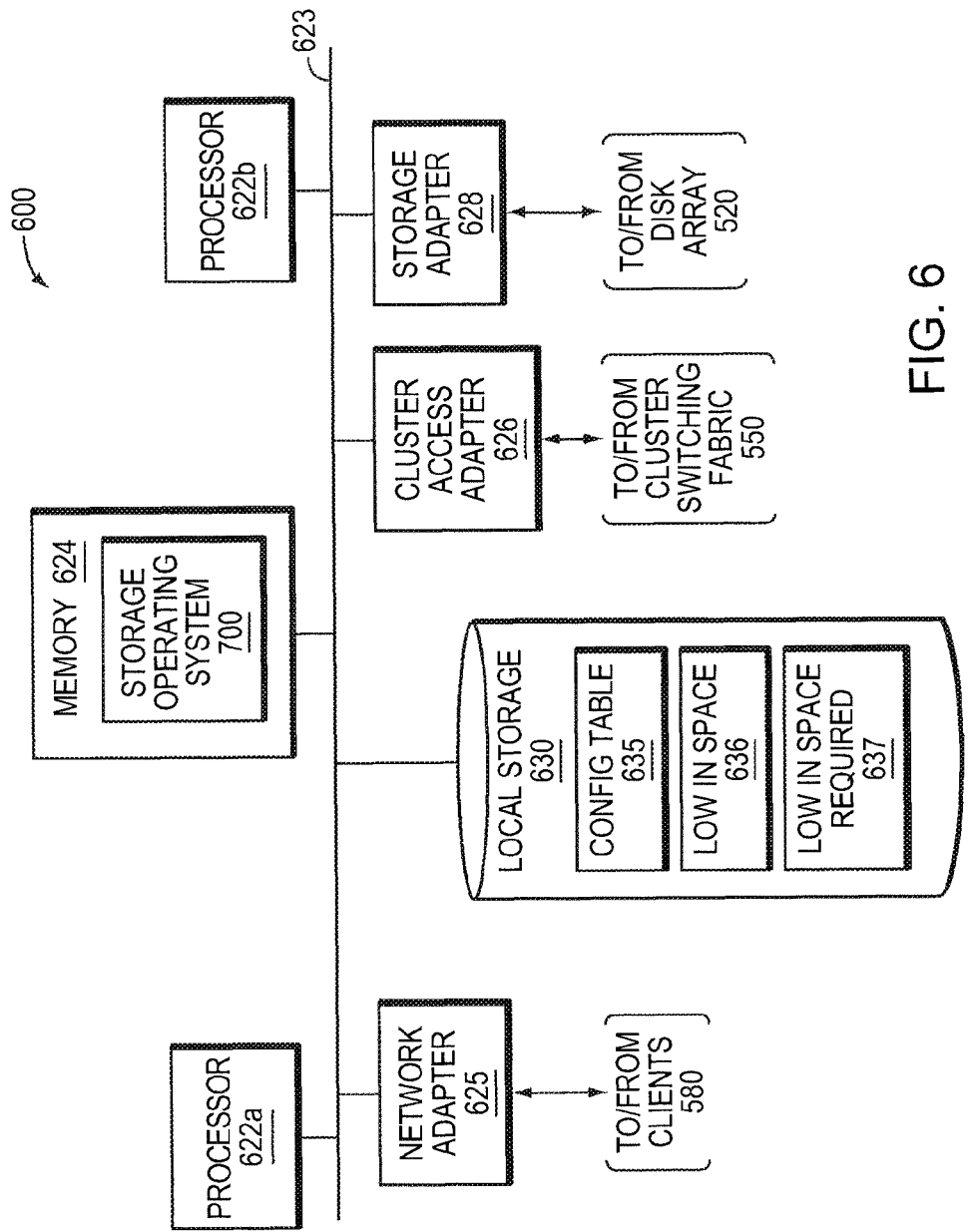
FIG. 6 is a schematic block diagram of a node in accordance with an embodiment of the present invention.

FIG. 6 is a schematic block diagram of a node 600 that is illustratively embodied as a storage system comprising a plurality of processors 622a,b, a memory 624, a network adapter 625, a cluster access adapter 626, a storage adapter 628 and local storage 630 interconnected by a system bus 623. The local storage 630 comprises one or more storage devices, such as disks, utilized by the node to locally store configuration information (e.g., in configuration table 635) provided by one or more management processes that execute as user mode applications 500 (see FIG. 5). The local storage 630 is also adapted to store data structures, such as space availability notification flags 636 and 637, described in further detail herein, that are used to notify the active file system about storage space limitations in a constituent volume with which the node is associated.

The cluster access adapter 626 comprises a plurality of ports adapted to couple the node 600 to other nodes of the cluster 500. In the illustrative embodiment, Ethernet is used as the clustering protocol and interconnect media, although it will be apparent to those skilled in the art that other types of protocols and interconnects may be utilized within the cluster architecture described herein. In alternate embodiments where the Nmodules and D-modules are implemented on separate storage systems or computers, the cluster access adapter 626 is utilized by the N/D-module for communicating with other N/D-modules in the cluster 500.

Each node 600 is illustratively embodied as a dual processor storage system executing a storage operating system 300 that preferably implements a high-level module, such as a file system, to logically organize the information as a hierarchical structure of named directories, files and special types of files called virtual disks (hereinafter generis ally "blocks") on the disks. However, it will be apparent to those of ordinary skill in the art that the node 600 may alternatively comprise a single or more than two processor system. Illustratively, one processor 622a executes the functions of the N-module 510 on the node, while the other processor 622b executes the functions of the D-module 550.

The memory 624 illustratively comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 300, portions of which is typically resident in memory and executed by the processing elements, functionally organizes the node 600 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 625 comprises a plurality of ports adapted to couple the node 600 to one or more clients 580 over point-to-point links, wide area networks, virtual private networks implemented over a public network (Internet) or a shared local area network. The network adapter 625 thus may comprise the mechanical, electrical and signaling circuitry needed to connect the node to the network. Illustratively, the computer network 540 may be embodied as an Ethernet network or a Fibre Channel (FC) network. Each client 580 may communicate with the node over network 540 by exchanging discrete frames or packets of data according to pre-defined protocols, such as TCP/IP.

The storage adapter 628 cooperates with the storage operating system 300 executing on the node 600 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 530 of array 520. The storage adapter comprises a plurality of ports having input/output (I/O) interface circuitry that couples to the disks over an I/O interconnect arrangement, such as a conventional high-performance, FC link topology.

Storage of information on each array 520 is preferably implemented as one or more storage "volumes" that comprise a collection of physical storage disks 530 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

C. Storage Operating System

To facilitate access to the disks 530, the storage operating system 700 implements a write-anywhere file system that cooperates with one or more virtualization modules to "virtualize" the storage space provided by disks 530. The file system logically organizes the information as a hierarchical structure of named data containers, such as directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of data containers, such as blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this invention.

Figure 7:
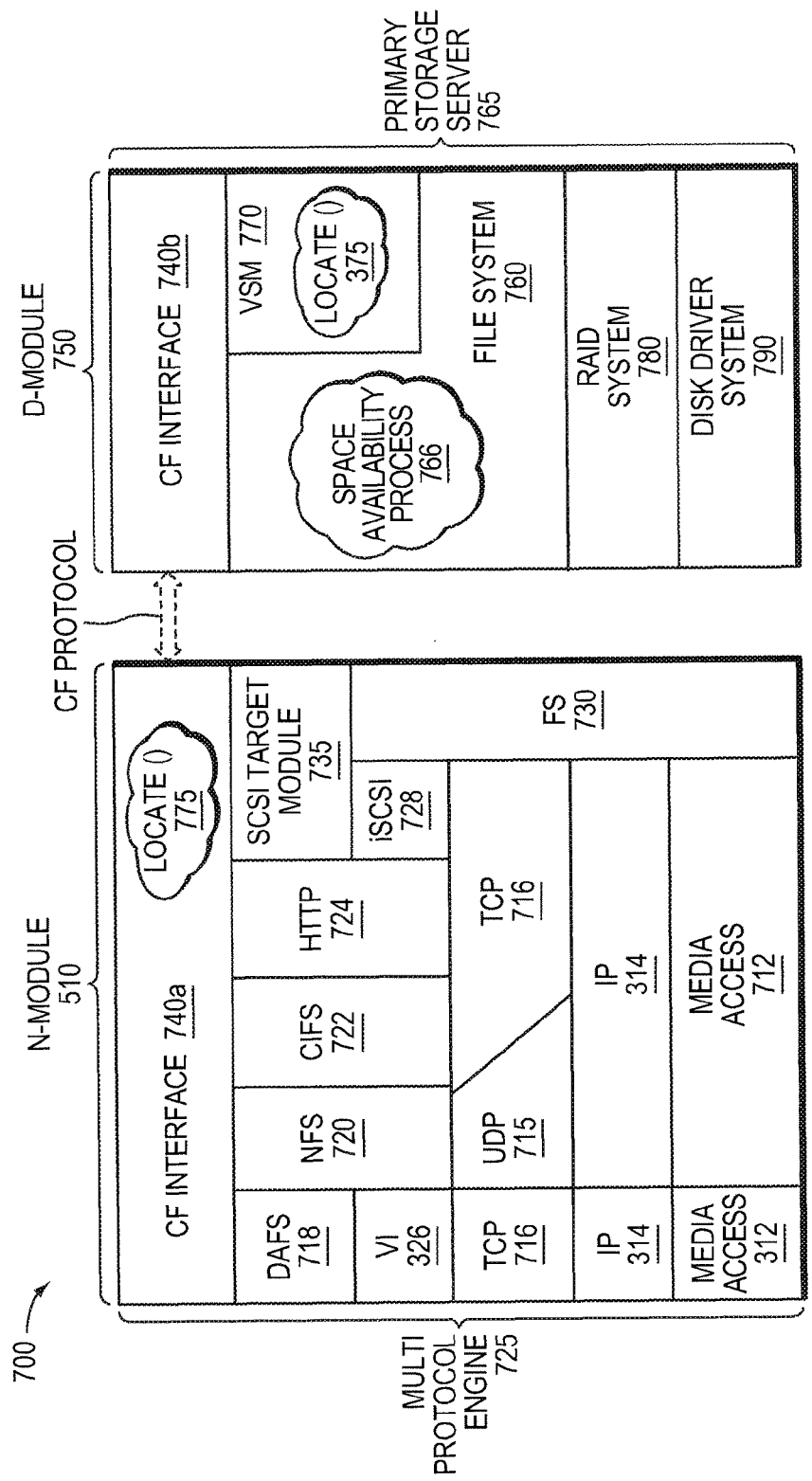
FIG. 7 is a schematic block diagram of a storage operating system that may be advantageously used with the present invention.

FIG. 7 is a schematic block diagram of the storage operating system 700 that may be advantageously used with the present invention. The storage operating system comprises a series of software layers organized to form an integrated network protocol stack or, more generally, a multi-protocol engine 725 that provides data paths for clients to access information stored on the node using block and file access protocols. The multi-protocol engine includes a media access layer 712 of network drivers (e.g., gigabit Ethernet drivers) that interfaces to network protocol layers, such as the IP layer 714 and its supporting transport mechanisms, the TCP layer 716 and the User Datagram Protocol (UDP) layer 715. A file system protocol layer provides multi-protocol file access and, to that end, includes support for the Direct Access File System (DAFS) protocol 718, the NFS protocol 720, the CIFS protocol 722 and the Hypertext Transfer Protocol (HTTP) protocol 724. A VI layer 726 implements the VI architecture to provide direct access transport (DAT) capabilities, such as RDMA, as required by the DAFS protocol 718. An iSCSI driver layer 728 provides block protocol access over the TCP/IP network protocol layers, while a FC driver layer 730 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 600.

In addition, the storage operating system includes a series of software layers organized to form a storage server 765 that provides data paths for accessing information stored on the disks 530 of the node 600. To that end, the storage server 765 includes a file system module 760 in cooperating relation with a volume striping module (VSM) 770, and a storage subsystem which may include, illustratively, a RAID system module 780 and a disk driver system module 790. In the illustrative embodiment, the RAID system 780 manages the storage and retrieval of information to and from the volumes/disks in accordance with I/O operations, while the disk driver system 790 implements a disk access protocol such as, e.g., the SCSI protocol. The VSM 770 illustratively implements a striped volume set (SVS). As described further herein, the VSM cooperates with the file system 760 to enable storage server 765 to service a volume of the SVS. In particular, the VSM 770 implements a Locate( ) function 775 to compute the location of data container content in the SVS volume to thereby ensure consistency of such content served by the cluster. The file system 760 also incorporates a space availability notification process 766, which in accordance with the present invention is used to manage space availability within a SVS. The space availability notification process running on an individual data volume node/storage server interacts with a master volume node/storage server to determine whether to accept or deny write access requests depending upon space availability within the constituent volumes comprising the SVS. More specifically, the space availability notification process running on the master data server uses the messaging protocol defined herein with respect to FIG. 8 to send space availability detection messages, the other corresponding messages as described herein. In addition the process 766 contains program instructions for performing the other operations described herein such as reading responses received from the nodes in response to such messages and determining, for example, whether write requests are to be allowed or denied, depending upon the state identifiers sent by each node. Other operations are carried out such as, for example, if there is no longer a node that returns a low in space identifier, then a message is sent to all volumes to clear a low in space required identifier.

The space availability notification process 766 running on each DV contains one or more program instructions allowing it to read space availability detection messages received from the master data server, and in response thereto to perform the fictitious write and to thereby determine whether a low in space identifier should be asserted. In addition, in response to messages from the master data server to set or unset a low in is space required identifier, then the individual node follows such commands and asserts/unasserts the identifier accordingly.

The file system 760 implements a virtualization system of the storage operating system 700 through the interaction with one or more virtualization modules illustratively embodied as, e.g., a virtual disk (vdisk) module (not shown) and a SCSI target module 735. The vdisk module enables access by administrative interfaces, such as a user interface of a management framework 900 (see FIG. 9), in response to a user (system administrator) issuing commands to the node 600. The SCSI target module 735 is generally disposed between the FC and iSCSI drivers 728, 730 and the file system 760 to provide a translation layer of the virtualization system between the block (lun) space and the file system space, where luns are represented as blocks.

The file system 760 is illustratively a message-based system that provides logical volume management capabilities for use in access to the information stored on the storage devices, such as disks. That is, in addition to providing file system semantics, the file system 760 provides functions normally associated with a volume manager. These functions include (i) aggregation of the disks, (ii) aggregation of storage bandwidth of the disks, and (iii) reliability guarantees, such as minoring and/or parity (RAID). The file system 760 illustratively implements the WAFL file system (hereinafter generally the "write-anywhere file system") having an on-disk format representation that is block-based using, e.g., 4 kilobyte (kB) blocks and using index nodes ("modes") to identify files and file attributes (such as creation time, access permissions, size and block location). The file system uses files to store meta-data describing the layout of its file system; these meta-data files include, among others, an mode file. A file handle, i.e., an identifier that includes an mode number, is used to retrieve an mode from disk.

Broadly stated, all modes of the write-anywhere file system are organized into the mode file. A file system (fs) info block specifies the layout of information in the file system and includes an mode of a file that includes all other modes of the file system. Each logical volume (file system) has an fsinfo block that is preferably stored at a fixed location within, e.g., a RAID group. The mode of the mode file may directly reference (point to) data blocks of the mode file or may reference indirect blocks of the mode file that, in turn, reference data blocks of the mode file. Within each data block of the mode file are embedded modes, each of which may reference indirect blocks that, in turn, reference data blocks of a file.

Operationally, a request from the client 580 is forwarded as a packet over the computer network 540 and onto the node 600 where it is received at the network adapter 225. A network driver (of layer 712 or layer 730) processes the packet and, if appropriate, passes it on to a network protocol and file access layer for additional processing prior to forwarding to the write-anywhere file system 760. Here, the file system generates operations to load (retrieve) the requested data from disk 530 if it is not resident "in core", i.e., in memory 224. If the information is not in memory, the file system 760 indexes into the mode file using the mode number to access an appropriate entry and retrieve a logical vbn. The file system then passes a message structure including the logical vbn to the RAID system 780; the logical vbn is mapped to a disk identifier and disk block number (disk,dbn) and sent to an appropriate driver (e.g., SCSI) of the disk driver system 790. The disk driver accesses the dbn from the specified disk 530 and loads the requested data block(s) in memory for processing by the node. Upon completion of the request, the node (and operating system) returns a reply to the client 580 over the network 540.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 600 in response to a request issued by client 580. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 600, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, and a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

D. CF Protocol

In the illustrative embodiment, the storage server 765 is embodied as D-module 550 of the storage operating system 700 to service one or more volumes of array 520. In addition, the multi-protocol engine 725 is embodied as N-module 510 to (i) perform protocol termination with respect to a client issuing incoming data access request packets over the network 540, as well as (ii) redirect those data access requests to any storage server 765 of the cluster 500. Moreover, the N-module 510 and D-module 550 cooperate is to provide a highly-scalable, distributed storage system architecture of the cluster 500. To that end, each module includes a cluster fabric (CF) interface module 740*a,b* adapted to implement intra-cluster communication among the modules, including D-module-to-D-module communication for data container striping operations described herein.

The protocol layers, e.g., the NFS/CIFS layers and the iSCSI/FC layers, of the N-module 510 function as protocol servers that translate file-based and block based data access requests from clients into CF protocol messages used for communication with the D-module 550. That is, the N-module servers convert the incoming data access requests into file system primitive operations (commands) that are embedded within CF messages by the CF interface module 740 for transmission to the D-modules 550 of the cluster 500. Notably, the CF interface modules 740 cooperate to provide a single file system image across all D-modules 550 in the cluster 500. Thus, any network port of an N-module that receives a client request can access any data container within the single file system image located on any D-module 550 of the cluster.

Further to the illustrative embodiment, the N-module 510 and D-module 550 are implemented as separately-scheduled processes of storage operating system 700; however, in an alternate embodiment, the modules may be implemented as pieces of code within a single operating system process. Communication between an N-module and D-module is thus illustratively effected through the use of message passing between the modules although, in the case of remote communication between an N-module and D-module of different nodes, such message passing occurs over the cluster switching fabric 550. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from Network Appliance, Inc. The SpinFS protocol is described in the above-referenced U.S. Pat. No. 6,671,773.

The CF interface module 740 implements the CF protocol for communicating file system commands among the modules of cluster 500. Communication is illustratively effected by the D-module exposing the CF API to which an N-module (or another D-module) issues calls. To that end, the CF interface module 740 is organized as a CF encoder and CF decoder. The CF encoder of, e.g., CF interface 740a on N-module 510 encapsulates a CF message as (i) a local procedure call (LPC) when communicating a file system command to a D-module 550 residing on the same node 600 or (ii) a remote procedure call (RPC) when communicating the command to a D-module residing on a remote node of the cluster 500. In either case, the CF decoder of CF interface 740b on D-module 550 de-encapsulates the CF message and processes the file system command.

Figure 8:
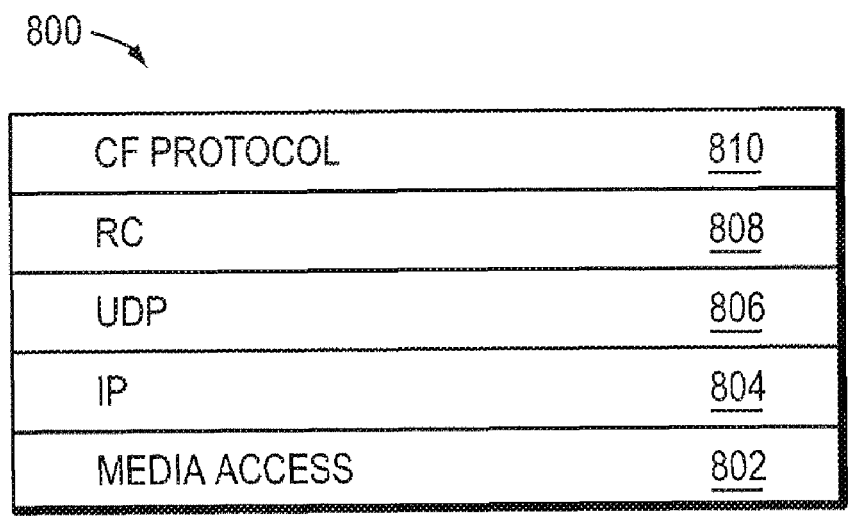
FIG. 8 is a schematic block diagram illustrating the format of a cluster fabric (CF) message in accordance with an embodiment of with the present invention.

FIG. 8 is a schematic block diagram illustrating the format of a CF message 800 in accordance with an embodiment of with the present invention. The CF message 800 is illustratively used for RPC communication over the switching fabric 550 between remote modules of the cluster 500; however, it should be understood that the term "CF message" may be used generally to refer to LPC and RPC communication between modules of the cluster. The CF message 800 includes a media access layer 802, an IP layer 804, a UDP layer 806, a reliable connection (RC) layer 808 and a CF protocol layer 810. As noted, the CF protocol is a generic file system protocol that conveys file system commands related to operations contained within client requests to access data containers stored on the cluster 500; the CF protocol layer 810 is that portion of message 800 that carries the file system commands. Illustratively, the CF protocol is datagram based and, as such, involves transmission of messages or "envelopes" in a reliable manner from a source (e.g., an N-module 510) to a destination (e.g., a D-module 550). The RC layer 808 implements a reliable transport protocol that is adapted to process such envelopes in accordance with a connectionless protocol, such as UDP 806.

F. VLDB

Figure 9:
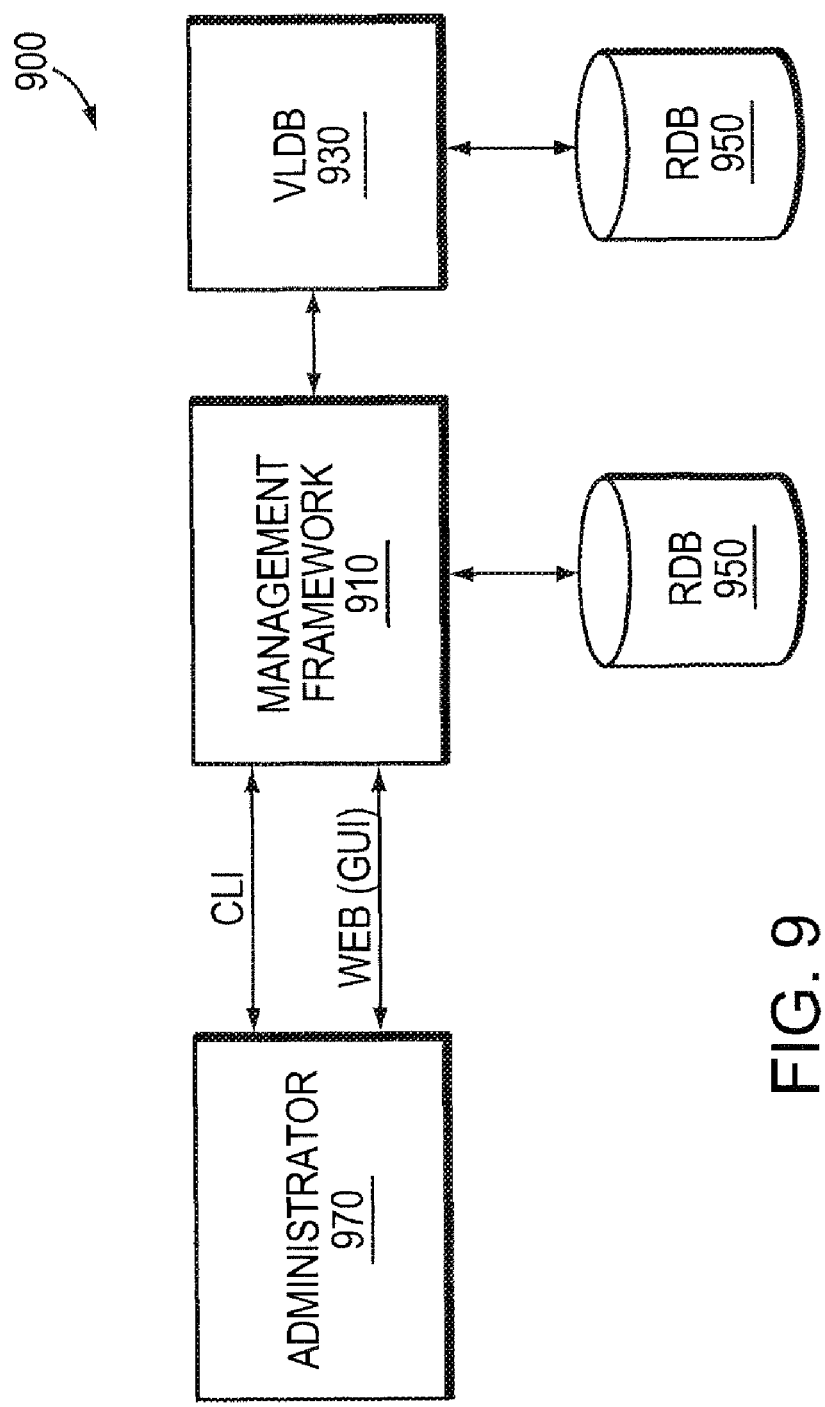
FIG. 9 is a schematic block diagram illustrating a collection of management processes in accordance with an embodiment of the present invention.

FIG. 9 is a schematic block diagram illustrating a collection of management processes that execute as user mode applications 900 on the storage operating system 700 to is provide management of configuration information (i.e. management data) for the nodes of the cluster. To that end, the management processes include a management framework process 910 and a volume location database (VLDB) process 930, each utilizing a data replication service (RDB 950) linked as a library. The management framework 910 provides a user to an administrator 970 interface via a command line interface (CLI) and/or a web-based graphical user interface (GUI). The management framework is illustratively based on a conventional common interface model (CIM) object manager that provides the entity to which users/system administrators interact with a node 600 in order to manage the cluster 500.

The VLDB 930 is a database process that tracks the locations of various storage components (e.g., SVSs, volumes, aggregates, etc.) within the cluster 500 to thereby facilitate routing of requests throughout the cluster. In the illustrative embodiment, the N-module 510 of each node accesses configuration table 235 that maps the SVS identifier (ID) of a data container handle to a D-module 550 that "owns" (services) the data container within the cluster. The VLDB includes a plurality of entries which, in turn, provide the contents of entries in the configuration table 235; among other things, these VLDB entries keep track of the locations of the volumes and aggregates within the cluster. Examples of such VLDB entries include a VLDB volume entry, a VLDB aggregate entry, and a VLDB SVS entry as described herein with reference to FIG. 10.

More specifically, the SVS is associated with a set of striping rules that define a stripe algorithm, a stripe width and an ordered list of volumes within the SVS. The striping rules for each SVS are illustratively stored as an entry of VLDB 930 and accessed by SVS ID. FIG. 10 is a schematic block diagram of an exemplary VLDB SVS entry 1000 in accordance with an embodiment of the present invention. The VLDB entry 1000 includes a master set identifier (MSID) field 1005 for each volume in the set, and one or more sets of striping rules 1030. In alternate embodiments, additional fields 1025, 1035 may be included. The MSID field 1005 contains the ID of a volume in the SVS. Thus, there is illustratively an entry for each volume in the SVS; alternatively, a larger data is structure (not shown) may provide a single entry for the entire SVS which includes the MSIDs and data set identifiers (DSIDs) for each constituent volume in the SVS.

Each set of striping rules 1030 illustratively includes a striping epoch field 1006 and a type (voltype) field 1007, the latter of which indicates whether the striping rule record refers to the actual volume, or instead refers to a snapshot of the volume. Illustratively, the field 1007 contains a value, which designates that the record relates to either a volume or a snapshot. Additionally, the entry includes a set size field 1008 that specifies the number of volumes in the SVS. The striping rule set also illustratively includes a stripe width field 1010, a stripe algorithm ID field 1015 and a DSID field 1020. The DSID field 1020 contains an identification of each instantiation of the volume or snapshot series as an ordered list of DSIDs.

The striping rules 1030 contain information for defining the organization of a SVS. For example, the stripe algorithm ID field 1015 identifies a striping algorithm used with the SVS. In the illustrative embodiment, multiple striping algorithms could be used with a SVS; accordingly, the stripe algorithm ID is needed to identify which particular algorithm is utilized. Each striping algorithm, in turn, specifies the manner in which file content is apportioned as stripes across the plurality of volumes of the SVS. The stripe width field 1010 specifies the size/width of each stripe. The DSID field 1020 contains the IDs of the volumes (or snapshots) comprising the SVS. Moreover, other fields may specify the function and implementation of the various volumes and striping rules of the SVS. For example, one or more other fields 1025, 1035 may denote the MDV of the SVS, and other fields may denote the manner of implementing a particular striping algorithm, e.g., round-robin.

As noted, the Locate( ) function 775 enables the VSM 770 and other modules (such as those of N-module 510) to locate a D-module 550 and its associated volume of a SVS in order to service an access request to a file. The Locate( ) function takes as arguments, at least (i) a SVS ID, (ii) an offset within the file, (iii) the mode number for the file and (iv) a set of striping rules 1030, and returns the volume on which that file offset begins within the SVS. For example, assume a data access request directed to a file isis sued by a client 580 and received at the N-module 510 of a node 600, where it is parsed through the multi-protocol engine 725 to the appropriate protocol server of N-module 510. To determine the location of a D-module 550 to which to transmit a CF message 800, the N-module 510 may first retrieve a SVS entry 1000 to acquire the striping rules 1030 (and list of volumes 1020) associated with the SVS. The N-module 510 then executes the Locate( ) function 775 to identify the appropriate volume to which to direct an operation. Thereafter, the N-Module may retrieve the appropriate VLDB volume entry to identify the aggregate containing the volume and the appropriate VLDB aggregate entry to ultimately identify the appropriate D-module 550.

The protocol server of N-module 510 then transmits the CF message 800 to the D-module 550.

Thus, it should be understood by those skilled in the art that the invention provides a method for managing space availability in a distributed environment. Specifically, due to the distributed nature of the striped file system across multiple nodes in a cluster, write requests can be routed to different constituent volumes, which may have different capacities or different levels of space availability. Detecting and handling the space availability or shortage among the distributed constituent volumes of the present invention allows a smoother I/O access to the striped volume because these requests can be routed to a different volume if another is low-in-space. The cross stripe write operation that has already been accepted is also accommodated in the present invention.

The foregoing description has been directed to particular embodiments of the invention. It will be apparent, however, that other variations and modifications may be made to the described embodiments with the attainment of some or all of their advantages. Specifically, it should be noted that the principles of the invention may be implemented in a non-distributed file system. Furthermore, while this description has been written in terms of D and N-modules, the teachings of the present invention are equally suitable to systems in which the functionality of the N and D-modules are implemented in a single system. Alternatively, the functions of the N and D-modules may be distributed among a number of separate systems, wherein in each system performs one or more functions. Additionally, the features of the present invention have been described with respect to a cluster, containing two nodes, however, it is equally applicable to clusters including a plurality of nodes, which allow for an n-way failover. Additionally, the procedures, processes and/or modules described herein may be implemented in hardware, software, embodied as a computer readable medium having program instructions, for one or a combination thereof. Therefore, it is the object of the appended claims to cover all such variations and modifications as come within the true spirit and scope of the invention.

What is claimed is:

1. A method for operating a computer data storage system, comprising:
   maintaining a striped volume set by striping a data container over a plurality of storage nodes of the storage system;
   determining by a first storage node of the plurality of storage nodes whether space available on the first storage node is below a predetermined threshold, the predetermined threshold indicating a low-in-space state;
   sending a first message to a master data server of the storage system from the first storage node indicating that the first storage node is in a low-in-space state; and
   sending a second message from said master data server to the plurality of nodes to set a low-in-space state identifier so that no further write operations are accepted for the striped volume set by the plurality of storage nodes.

2. The method as in claim 1, further comprising:
   determining if a write data in a write request will fit into a selected stripe of the striped volume set, and if the write data requires more space than is available in the selected stripe, then obtaining a lock on space in a next stripe of the striped volume set to hold any data remaining after writing the data to the selected stripe, and writing the remaining data to the next stripe.

3. The method as in claim 2, further comprising:
   if the write data is too much data to fit into the next stripe, then writing a further remaining data of the write data into a further next stripe.

4. The method as in claim 1, further comprising:
   after detecting that a write request will place a storage node into a low-in-space state, writing a data of the write request into a reserved space of a storage node of the plurality of storage nodes.

5. The method as in claim 1, further comprising:
   configuring the master data server to periodically send a space availability detection message to each storage node of the plurality of storage nodes.

6. The method as in claim 5, further comprising:
   in response to receiving the space availability detection message, a storage node determining whether space available on that node is below a predetermined threshold, the predetermined threshold indicating a low-in-space state.

7. The method as in claim 6, further comprising:
   returning a response from each storage node indicating whether the each storage node is in a low-in-space state.

8. The method as in claim 7, further comprising:
   in response to said master data server receiving a response message from a responding node of the plurality of nodes indicating that the responding node is in a low-in-space state, setting a status of the plurality of nodes to indicate that the plurality of nodes is in a low-in-space state.

9. The method as in claim 8, further comprising:
   sending, in response to the message from the responding node, a third message from said master data server to all nodes of the plurality of nodes to set a low-in-space state identifier.

10. The method as in claim 9, further comprising:
    accepting no further write operations in the data container while one or more of the storage node is in a low-in space state.

11. The method as in claim 10, further comprising:
    accepting write operations for the data container after each storage node of the plurality of storage nodes has transitioned to a state indicating that it is not in a low-in space state.

12. A computer data storage system apparatus, comprising:
    a processor to maintain a striped volume set by striping a data container over a plurality of storage nodes of the storage system;
    a first storage node of the plurality of storage nodes to determine whether space available on the first storage node is below a predetermined threshold, the predetermined threshold indicating a low-in-space state;
    the first storage node to send a message to a master data server of the storage system indicating that the first storage node is in a low-in-space state; and
    sending a second message by the master data server to the plurality of nodes to set a low-in-space state identifier so that no further write operations are accepted for the striped volume set by the plurality of storage nodes.

13. The apparatus as in claim 12, further comprising:
    the processor to determine if a write data in a write request will fit into a selected stripe of the striped volume set, and if the write data requires more space than is available in the selected stripe, then obtaining a lock on space in a next stripe of the striped volume set to hold any data remaining after writing the data to the selected stripe, and writing the remaining data to the next stripe.

14. The apparatus as in claim 13, further comprising:
if the write data is too much data to fit into the next stripe, then writing a further remaining data of the write data into a further next stripe.

15. The apparatus as in claim 12, further comprising:
the processor, after detecting that a write request will place a storage node into a low-in-space state, to write a data of the write request into a reserved space of a storage node of the plurality of storage nodes.

16. The apparatus as in claim 12, further comprising:
a master data server to periodically send a space availability detection message to each storage node of the plurality of storage nodes.

17. The apparatus as in claim 12, further comprising:
in response to receiving the space availability detection message, a storage node to determine whether space available on that node is below a predetermined threshold, the predetermined threshold indicating a low-in-space state.

18. The apparatus as in claim 17, further comprising:
each storage node to return a third message to the master data server indicating whether the each storage node is in a low-in-space state.

19. The apparatus as in claim 18, further comprising:
the master data server, in response to receiving the third message, to set a status of the plurality of nodes to indicate that the plurality of nodes is in a low-in-space state.

20. The apparatus as in claim 18, further comprising:
said master data server, in response to the third message, sending a message to all nodes of the plurality of nodes to set a low-in-space state identifier.

21. The apparatus as in claim 20, further comprising:
the processor to accept no further write operations in the data container while one or more of the storage nodes of the plurality of nodes is in a low-in space state.

22. The apparatus as in claim 21, further comprising:
the processor to accept write operations for the data container after each storage node of the plurality of storage nodes has transitioned to a state indicating that it is not in a low-in-space state.

23. A computer readable nontransitory storage media, comprising:
said computer readable storage media containing program instructions for execution on a processor for a method of operating a computer data storage system, the program instructions for,
maintaining a striped volume set by striping a data container over a plurality of storage nodes of the storage system;
determining by a first storage node of the plurality of storage nodes whether space available on the first storage node is below a predetermined threshold, the predetermined threshold indicating a low-in-space state;
sending a first message from a storage node to a master data server of the storage system indicating that the storage node is in a low-in-space state; and
sending a second message from said master data server to the plurality of nodes to is set a low-in-space state identifier so that no further write operations are accepted for the striped volume set by the plurality of storage nodes.

\* \* \* \* \*

UNITED STATES PATENT AND TRADEMARK OFFICE
CERTIFICATE OF CORRECTION

PATENT NO. : 8,095,730 B1
APPLICATION NO. : 12/839530
DATED : January 10, 2012
INVENTOR(S) : Tianyu Jiang et al.

It is certified that error appears in the above-identified patent and that said Letters Patent is hereby corrected as shown below:

In Col. 2, line 26:
A ~~is~~ master data volume node is configured to periodically In Col. 3, line 41:
embodiments of ~~is~~ the invention, a different node or server In Col. 6, line 45:
example, the ~~is~~ stripe width is 2MB, and the write request In Col. 6, line 66:
occurs when the cross ~~is~~ stripe write operation is accommo- In Col. 8, line 51:
illustrative embodiment ~~is~~ of the invention, the environment In Col. 9, line 26:
information in the form ~~is~~ of files and directories. Alterna- In Col. 9, line 64:
called virtual disks (hereinafter ~~generis ally~~ generally "blocks") on the In Col. 12, line 55:
~~minoring~~ mirroring and/or parity (RAID). The file system 760 illustra- In Col. 12, line 59:
byte (kB) blocks and using index nodes ~~("modes")~~ ("inodes") to identify In Col. 12, line 63:
meta-data files include, among others, an ~~mode~~ inode file. A file Signed and Sealed this
Thirtieth Day of October, 2012

David J. Kappos
*Director of the United States Patent and Trademark Office*

CERTIFICATE OF CORRECTION (continued)
U.S. Pat. No. 8,095,730 B1

In Col. 12, line 64:
    handle, i.e., an identifier that includes an ~~mode~~ inode number, is In Col. 12, line 65:
    used to retrieve an ~~mode~~ inode from disk.

In Col. 12, line 66:
    Broadly stated, all ~~modes~~ inodes of the write-anywhere file system In Col. 12, line 67:
    are organized into the ~~mode~~ inode file. A file system (fs) info block In Col. 13, line 2:
    includes an ~~mode~~ inode of a file that includes all other ~~modes~~ inodes of the In Col. 13, line 5:
    a RAID group. The ~~mode~~ inode of the ~~mode~~ inode file may directly In Col. 13, line 6:
    reference (point to) data blocks of the ~~mode~~ inode file or may In Col. 13, line 7:
    reference indirect blocks of the ~~mode~~ inode file that, in turn, refer- In Col. 13, line 8:
    ence data blocks of the ~~mode~~ inode file. Within each data block of In Col. 13, line 9:
    the ~~mode~~ inode file are embedded ~~modes~~ inodes, each of which may ref- In Col. 13, line 22:
    the ~~mode~~ inode file using the ~~mode~~ inode number to access an appropriate In Col. 14, line 22:
    N-module 510 and D-module 550 cooperate ~~is~~ to provide a In Col. 15, line 39:
    applications 900 on the storage operating system 700 to ~~is~~

In Col. 16, line 13:
    for each volume in the SVS; alternatively, a larger data ~~is~~

In Col. 16, line 52:
    the file, (iii) the ~~mode~~ inode number for the file and (iv) a set of

CERTIFICATE OF CORRECTION (continued)
U.S. Pat. No. 8,095,730 B1

In Col. 16, line 55:
 access request directed to a file ~~isis sued~~ is issued by a client 580 and In Col. 20, line 27:
 the plurality of nodes to ~~is~~ set a low-in-space state iden-